SOLID STATE SEQUENCING AND TIMING CIRCUIT

Filed May 1, 1963 3 Sheets-Sheet 1

INVENTOR.
CHARLES F. MEYER
JAMES J. ECKL
BY
William H. Schmeling

| PERIOD COUNTER "C" | | | | | |
|---|---|---|---|---|---|
| | OUTPUT SIGNALS | | | | |
| | SB | S | W | H | O |
| OC1 | 1 | 1 | 0 | 1 | 0 |
| OC2 | 0 | 0 | 1 | 0 | 1 |
| OC3 | 1 | 1 | 1 | 0 | 0 |
| OC4 | 0 | 0 | 0 | 1 | 1 |

INVENTOR.
CHARLES F. MEYER
JAMES J. ECKL
BY
William H. Schmaling

SOLID STATE SEQUENCING AND TIMING CIRCUIT

Filed May 1, 1963 3 Sheets-Sheet 3

INVENTOR.
CHARLES F. MEYER
JAMES J. ECKL
BY
William H. Schmeling

United States Patent Office 3,267,303 Patented August 16, 1966

3,267,303

SOLID STATE SEQUENCING AND TIMING CIRCUIT

Charles F. Meyer and James J. Eckl, Milwaukee, Wis., assignors to Square D Company, Park Ridge, Ill., a corporation of Michigan Filed May 1, 1963, Ser. No. 277,189
18 Claims. (Cl. 307—141)

The present invention relates to electric control systems and is more particularly concerned with static logic circuitry for programming a series of operations of predetermined time duration and including improved static switching circuits.

Conventional resistance welder controllers usually are required to sequence and control a plurality of operations having respective time periods as follows: a squeeze-time period, during which the welder electrodes are moved into engagement with the parts to be welded; a weld-time period, during which welding current is caused to flow for welding the parts together; a hold-time period, during which the electrodes are held in engagement with the work to permit the welded metal of the parts to cool; and, an off-time period, during which the welder electrodes separate so they may be repositioned to form another weld. If desired, the controller may also provide a squeeze-delay period which effectively increases the squeeze-time period for the first welding sequence of a series of welds.

In the evolution of resistance welding controls, the original resistance welder controllers employed mechanical or electro-mechanical switching devices. These were replaced in succession by electronic tubes, such as thyratrons, and by semi-conductor devices, such as transistors. An example of a resistance welding controller which employs static components to achieve the sequencing and timing of the operations is disclosed in application for U.S. Patent, Serial No. 129,828, filed August 7, 1961. This application has been assigned by the inventors, Charles F. Meyer and James J. Eckl, to the assignee of the present invention. The control system disclosed in the Meyer et al. application uses PNP type transistors which are connected in a transistorized NOR circuit configuration to achieve the basic logic functions.

The NOR logic element described in the foregoing Meyer et al. application is arranged so that the transistors within the NOR logic elements or units have their emitters connected to a common bus and their collectors connected to a supply which is negative relative to the common bus so a negative voltage signal at any of its inputs or bases of the transistor within the NORS causes the transistor in the NOR to switch to a conductive state thereby to prevent the appearance of a negative signal at its output terminals which is tied to the collector of the transistor. For purposes of illustration, in both the Meyer et al. application and in this application, an absence of an input or output signal will be designated as an "0" signal and the presence of an input or output signal will be designated as a "1" signal. Thus a "1" signal at any input of a NOR unit causes the NOR to have an "0" output signal and "0" signals at all inputs of a NOR unit causes the NOR unit to have a "1" output signal.

The NOR units can be used with diodes which provide an "OR" logic function and can be combined to provide a NOR memory. These arrangements, as well as arrangements whereby basic NOR units and NOR memories are combined with resistors, capacitors, and diodes to provide time delay functions and counting functions, are also fully described in the Meyer application.

It is an object of the present invention to provide a control system which will determine both the sequence and duration of a plurality of time delay operations and which control system includes a single timer having a NOR memory and a timing capacitor, a plurality of timing resistors equal in number to the number of operations to be sequenced, a counter arranged to provide a plurality of combinations of output signals equal to the number of operations to be sequenced, and a circuit arrangement connecting the timer, the resistors and the counter for causing the timing capacitor to be charged through any one of the resistors for a period determined by the timer in a sequence determined by the counter.

Another object is to provide a static resistance welder control system which includes NOR and OR logic units and wherein a single timer has a timing capacitor chargeable through any one of a plurality of resistors for an interval determined by the timer in a sequence determined by a counter.

A further object is to provide a static resistance welder control system which includes "NOR" and "OR" logic units and wherein a single timer having a timing capacitor and a NOR memory is switched whenever a charge on the capacitor exceeds a predetermined value and cooperates with a counter and a plurality of timing resistances to time a plurality of operations in a sequence determined by the timer.

Further objects and features of the invention will be readily apparent to those skilled in the art from the following specification and the appended drawings illustrating certain preferred embodiments in which:

FIG. 1 schematically shows a static resistance welder control system in accordance with the present invention.

Figures 1, 4:
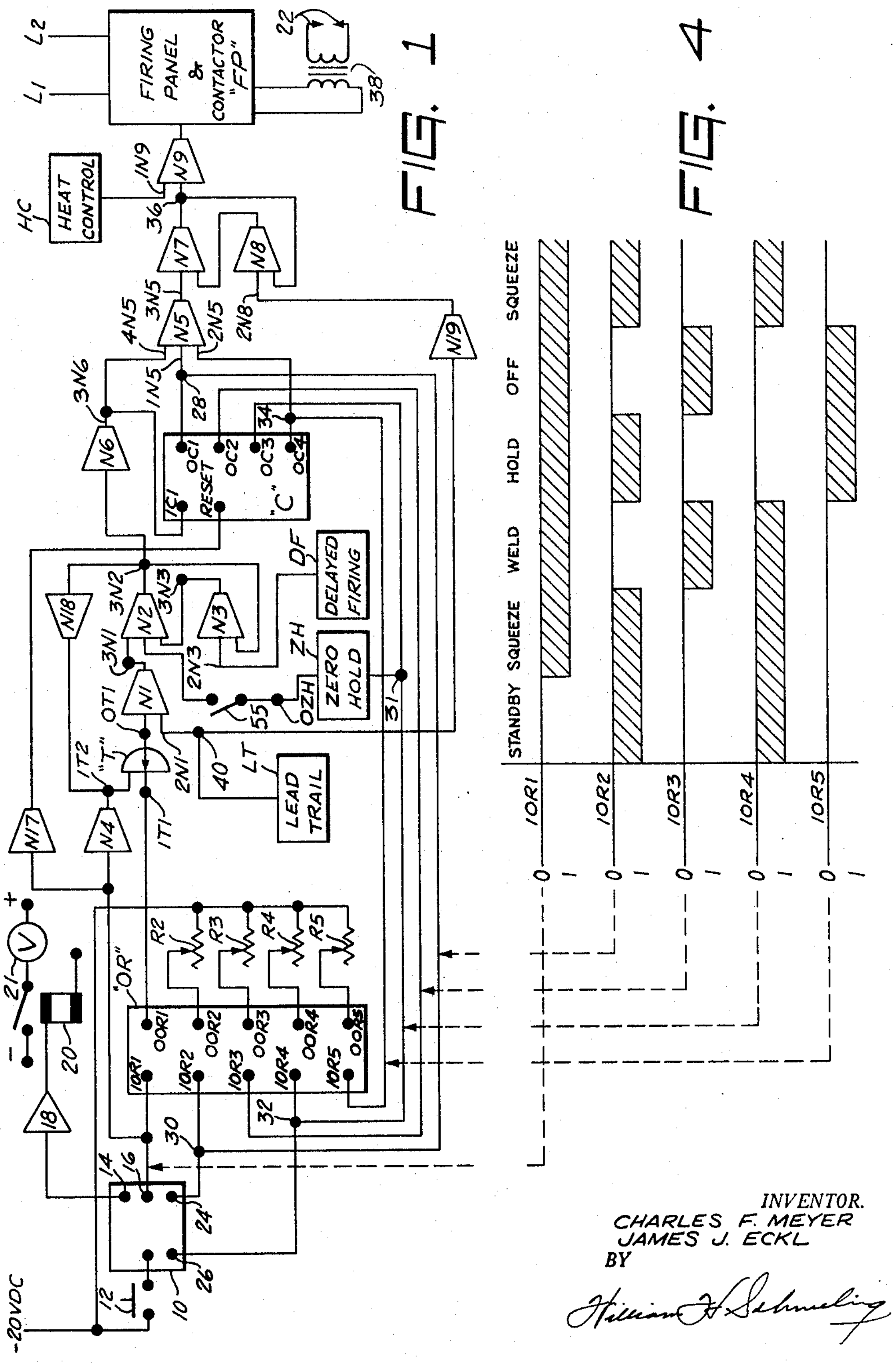
Figures 2, 5:
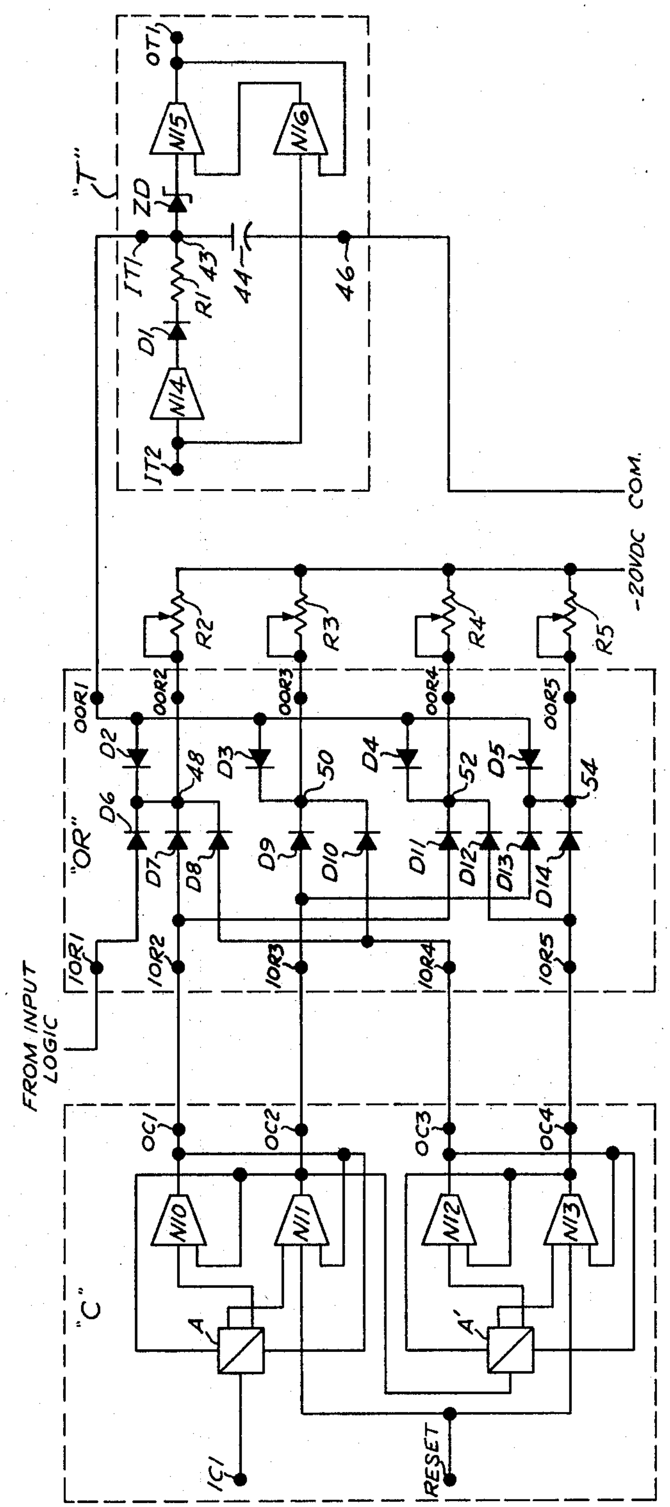
FIG. 2 is a wiring diagram of a counter, a timer and an "OR" module or unit as used in FIG. 1.

FIGS. 4 and 5, respectively, show a block diagram and a switching table using logic symbols to represent the signals provided by terminals and junctions of FIG. 1.

Figure 6:
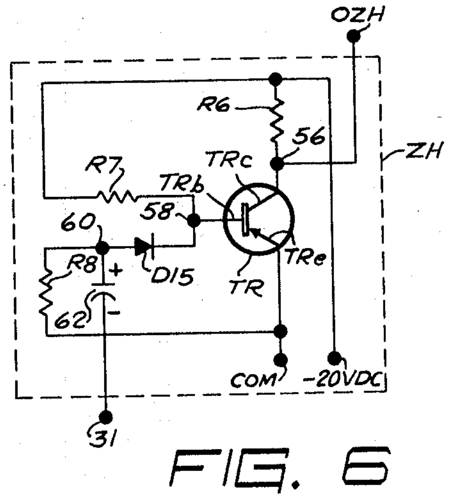

FIG. 6 shows a portion of the circuit for obtaining zero hold time.

FIG. 1 includes a plurality of NOR units or logic elements which are shown by conventional symbols and which will be referred to as NORS instead of NOR units.

A static welder control, shown in FIG. 1, incorporating the features of the present invention, is diagrammatically illustrated and includes an input logic module 10 which in response to the closure of an initiating switch 12 changes an "0" signal to a "1" signal at a pair of output terminals 14 and 16. The change to a "1" signal at terminal 14 energizes, through a suitable amplifier 18, a relay 20. The relay 20 has a pair of contacts which close when the relay 20 is energized to complete a circuit to an electro-pneumatic motor 21, which is arranged to move a pair of electrodes 22 into engagement with the work pieces to be welded. The module 10 is provided with suitable memory circuit arrangements to cause the "1" signal to remain thereby to continue energization of the relay 20 throughout the weld sequence even though the initiating switch 12 should be opened during the sequence. Further, the module 10 is arranged to have "1" signals at the terminals 14 and 16 thereby to cause the relay 20 to be energized as long as a "1" signal is present at either of a pair of input terminals 24 or 26 of the module 10.

The output terminal 16 of the module 10 is connected to an input terminal 1OR1 of an OR circuit module "OR" shown in detail in FIG. 2. The module "OR" also has input terminals 1OR2, 1OR3, 1OR4 and 1OR5 as well as output terminals 0OR1, 0OR2, 0OR3, 0OR4 and 0OR5. The output terminals 0OR2, 0OR3, 0OR4 and 0R5 are respectively connected through adjustable resistors R2, R3, R4, and R5 to a source of negative voltage to which the initiating switch 12 is also connected. The output terminal 0OR1 is connected to an input terminal 1T1 of a timer module "T" which has an additional input terminal 1T2 and an output terminal 0T1. The output terminal 0T1 is connected to an input terminal of a NOR N1, which has a second input terminal 2N1 and an output terminal 3N1. The output terminal 3N1 is connected to an input terminal of a NOR N2 which has an output terminal 3N2. A NOR N3 has an input connected to the output terminal 3N2 and an output terminal 3N3 connected to another input of the NOR N2 so that the NORS N2 and N3 act as a NOR memory. The NOR N3 has an additional input terminal 2N3. The output terminal 3N2 is connected through a NOR N18 to the input terminal 1T2 of the timer "T." The output terminal 16 of the input logic module 10, is also connected, through a NOR N4, to the terminal 1T2 of timer "T."

The output terminal 3N2 is connected through a NOR N6 to an input terminal 1C1 of a counter module "C." The counter "C" has output terminals 0C1, 0C2, 0C3, and 0C4 and a reset input terminal which is connected through a NOR N17 to the terminal 16. The output terminal 0C1 is connected through a junction 28 to an input terminal 1N5 of a NOR N5 and through a junction 30 to the input terminal 10R2 and to the input terminal 24. The output terminal 0C2 is directly connected to the input terminal 10R3. The output terminal 0C3 is connected through a junction 31 to a junction 32 which in turn is connected to the input terminals 26 and 10R4. The output terminal 0C4 is connected through a junction 34 to a second input 2N5 of the NOR N5 and to the input terminal 10R5. The output terminal 3N6 of the NOR N6 is connected to a third input terminal 4N5 of the NOR N5 as well as the input terminal 1C1 of the counter. The NOR N5 has an output terminal 3N5 connected to an input terminal of a NOR N7 which has an input connected to an output terminal of a NOR N8 so that NORS N7 and N8 act as a NOR memory, the output of which is the output signal from the NOR N7 at a junction 36. The junction 36 is connected to an input of a NOR N9 which has an output connected to a firing panel and ignitron contactor "FP."

The firing panel FP is energized from a suitable source of alternating current indicated by the leads L1 and L2 and preferably includes a pair of ignitrons arranged to supply the primary winding of a welding transformer 38 which has a secondary winding connected to supply the welder electrodes 22.

Figure 3:
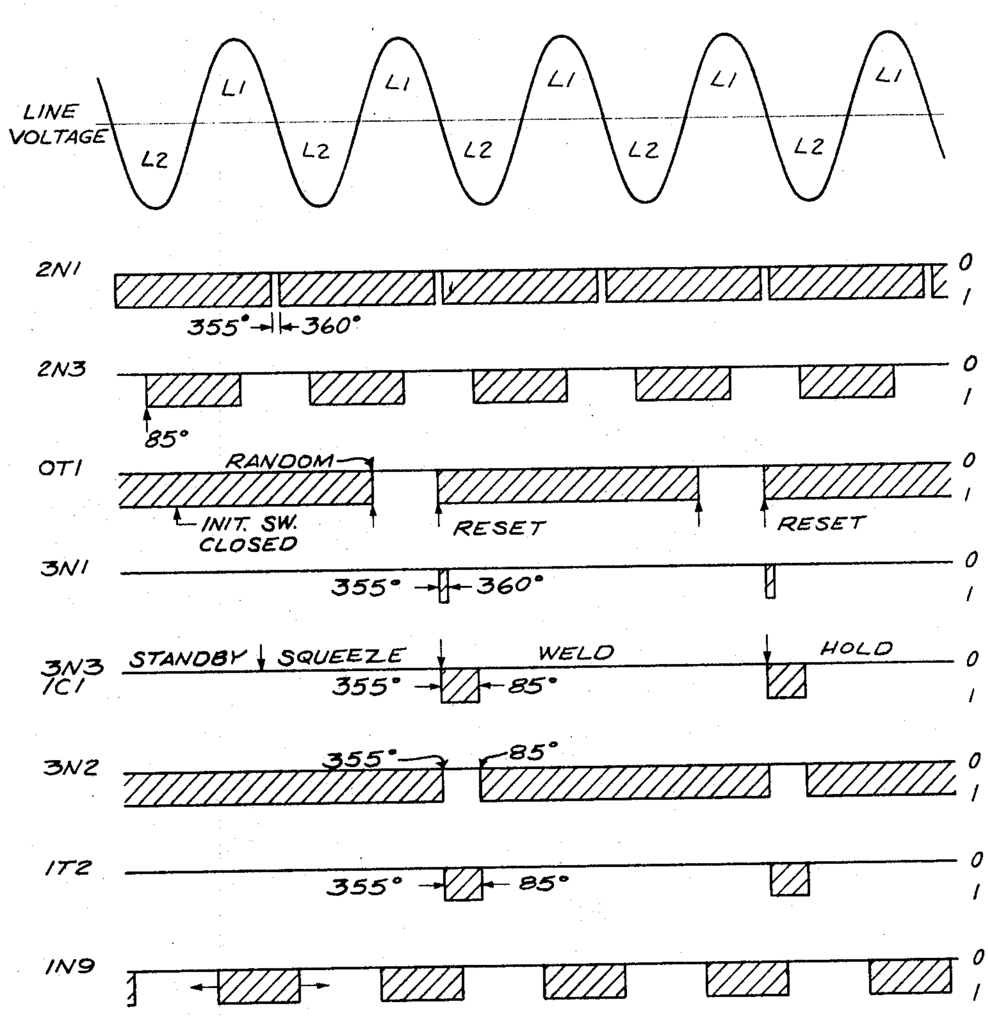
FIG. 3 illustrates, by curves with time as a reference, the signal voltages present in FIG. 1.

The circuit shown in FIG. 1 also has a lead-trail module LT, a delayed firing module DF, and a heat control module HC, which are arranged to supply output signals as shown in curves 2N1, 2N3 and 1N9 of FIG. 3 of the drawings. The output of the lead trail module LT is connected through a junction 40 to directly supply the input terminal 2N1 of the NOR N1 and through a NOR unit N19 to supply an input terminal 2N8 of the NOR N8. The output of the delay firing module DF supplies a signal to the input 2N3 of the NOR N3 and the output of the heat control module HC supplies an input signal to an input terminal 1N9 of the NOR N9.

The components within the counter "C," the OR module "OR," and the timer module "T" are shown in FIG. 2, and the respective output and input terminals have the same reference characters as in FIG. 1. The counter "C" includes a pair of pulse alternators A and A′, also known as steering circuits, and NORS N10, N11, N12 and N13 which are paired to provide two NOR memories with the NORS N10 and N11 providing one NOR memory and the NORS N12 and N13 the other NOR memory. The pulse alternators A and A′ are connected to the NOR memories as shown to provide output signals at the output terminals 0C1, 0C2, 0C3, and 0C4 in response to changes in the input signal at the input terminal 1C1. The reset terminal of the counter "C" is connected to the inputs of the NORS N11 and N13. Prior to the beginning of each counting sequence, the reset terminal receives a "1" signal from NOR N17 which switches both of the NOR memories so that the NORS N11 and N13 provide an "0" signal at the output terminals 0C2 and 0C4 and the NORS N10 and N12 provide a "1" signal at the terminals 0C1 and 0C3, as shown in a column headed SB in the table of FIG. 5. The column SB indicates the condition of the timer during standby periods. The signal at the input terminal 1C1 is normally "0." The pulse alternators A and A′ and the NOR memories including NORS N10–13 are arranged so that the NOR memories switch only when the signal at the terminal 1C1 changes from "1" to "0" as described in the Meyer et al. application supra, or in Section 15, pages 54–56 of the 1st edition of the "Handbook of Semiconductor Electronics" by Lloyd C. Hunter, copyrighted in 1956 by the McGraw Hill Book Company.

When the initiating switch 12 is closed, the standby period ends and the output signal at the terminal 16 of the module 10 changes from "0" to a "1." The signal change at the terminal 16 is inverted to an "0" by the NOR 17 and thereby removes the "1" reset signal to the counter "C" and remains "0" throughout the welding sequence, which includes the squeeze, weld, hold and off periods. The change of the reset signal to "0" is without effect, the NOR memories formed by NORS N10–13 continue to supply signals as shown in FIG. 5, column S, which indicates the signals during the squeeze period, because the signal at 1C1 remains "1." At the end of each timing interval, as will be later explained, a short signal pulse of "1" is impressed on the terminal 1C1. As shown by the curve 1C1 in FIG. 3, the signal at the terminal 1C1 at the end of each timing period changes from "0" to "1" at 355° of the L1 half cycle of the supply voltage and from "1" to "0" at 85° of the L2 half cycle of the supply voltage. Thus at 85° of the L2 half cycle, when the signal at the terminal 1C1 changes from "1" to "0," the NOR memory consisting of NORS N10 and N11 switches to provide an "0" signal at the terminal 0C1 and a "1" signal at the terminal 0C2, as shown in the W column of FIG. 5. It will be observed that the output of the NOR N11 provides an input signal to the pulse alternator A′. Thus, as the output signal from the NOR N11 to terminal 0C2 changes from "0" to "1," a similar signal change occurs at the pulse alternator A′. This change in a signal input to the pulse alternator A′, however, does not cause the NOR memory consisting of the NORS N12 and N13 to switch, so the signals at the terminals 0C3 and 0C4 continue as "1" and "0" during the weld period as indicated by the W column.

At the end of the weld period the terminal 1C1 receives a signal pulse which changes from "0" to "1" at 355° and from "1" to "0" at 85°, as previously described for the end of the squeeze period. The resulting change in the signal from "1" to "0" at the input terminal 1C1 of the pulse alternator A causes the NOR memory consisting of the NORS N10 and N11 to switch so the signals at the terminals 0C1 and 0C2 become "1" and "0" as shown in the H column in FIG. 5. The change in the output signal of the NOR 11 from "1" to "0" is transmitted to the terminal 0C2 and to the input terminal of the pulse alternator A′. The change in the input signal from "1" to "0" at the pulse alternator A′ causes the NOR memory consisting of the NORS N12 and N13 to switch to provide a signal change at the terminals 0C3 and 0C4, as shown in the H column of FIG. 5. The terminal 0C3 now provides a "0" signal and the terminal 0C4 provides a "1" signal. The column H indicates the hold period of the welding sequence.

At the end of the hold period, the input terminal 1C1 receives a signal pulse which changes from "0" to "1" at 355° and from "1" to "0" at 85°, as previously described. The change in the input from "1" to "0" of the pulse alternator A causes the NOR memory consisting of NORS N10 and N11 to switch so that the signals at the terminals 0C1 and 0C2 become "0" and "1" as shown in the 0 column in FIG. 5. The change in the output signal of the NOR N11 from "0" to "1" does not cause the pulse alternator A' to switch the memories consisting of the NORS N12 and N13 and the signals at the terminals 0C3 and 0C4 thus continue as "0" and "1" during the off period as indicated by the 0 column in FIG. 5.

At the end of the off period, the input terminal 1C1 again receives a signal pulse which changes from "0" to "1" at 355° and from "1" to "0" at 85°. The change in input signal at the terminal 1C1 from "1" to "0" causes the NOR memory consisting of the NORS N10 and N11 to switch causing the signals at the terminals 0C1 and OC2 to become "1" and "0" respectively. The change in the signal at the terminal 0C2 from "1" to "0" causes the pulse alternator A' to change the condition of the NOR memory consisting of the NORS N12 and N13 and the signals at the terminals 0C3 and 0C4 become "1" and "0." Thus, at the end of the off period, the counter "C" returns to the condition it had during standby and squeeze periods.

If the initiating switch 12 is maintained closed at the end of the off period, the counter "C" repeats the sequence of operations previously described. If, at the end of the welding sequence, the initiating switch 12 is open, the module 10 will cause the counter "C" to operate through one sequence including the off period, whereafter the counter switches to the standby condition. The preceding description of the counter "C" is sufficient to understand the present invention. A more detailed description is included in the Meyer et al. application cited hereinbefore.

The timing module "T," as shown in FIG. 2, comprises NORS N14, N15 and N16 with the NORS N15 and N16 paired to provide a NOR memory. The input terminal 1T2 is connected to an input terminal of the NOR N14 and to the reset input terminal of the NOR N16. An output terminal of the NOR N14 is connected through a diode D1 and a resistor R1 to a junction 43 in turn connected through a zener diode ZD to an input terminal of the NOR N15. The junction 43 is directly connected to the input terminal 1T1. The junction 43 is also connected through a timing capacitor 44 to a junction 46 in the common lead for the entire system. The input terminal 1T2 is connected to the output terminal of the NOR N4 (FIG. 1) and the output terminal 0T1 is connected to one of the input terminals of the NOR N1. As shown in both FIGS. 1 and 2, the input terminal 1T1 is directly connected to the output terminal 00R1 of the module "OR."

The module "OR" having the input terminals 10R1, 10R2, 10R3, 10R4 and 10R5 and output terminals 00R1, 00R2, 00R3, 00R4 and 00R5 includes a plurality of diodes D2 through D14. The output terminal 00R1 is connected through the diodes D2, D3, D4 and D5 to junctions 48, 50, 52 and 54 respectively. The input terminal 10R1 is connected through the diode D6 to the junction 48. The input terminal 10R2 is connected through the diodes D7 and D11 to the junctions 48 and 52, respectively. The input terminal 10R3 is connected through the diodes D9 and D13 to the junctions 50 and 54, respectively. The input terminal 10R4 is connected through the diodes D8 and D10 to the junctions 48 and 50, respectively. The input terminal 10R5 is connected through the diodes D12 and D14 to the junctions 52 and 54, respectively. Each of the diodes D2–D14 are connected to conduct current toward the respective junctions to which they are connected and block current flow in the reverse direction. The resistors R2, R3, R4 and R5 are adjustable and connected between the output terminals 00R2, 00R3, 00R4 and 00R5, respectively, to a negative side of a source of unidirectional voltage which has its neutral or relatively positive terminal connected to the junction 46.

The switching sequences of the NORS N1, N2, N3 and N4 will now be explained with reference to the curves of FIG. 3 which have the same designations as the various input and output terminals to which they relate with the voltage wave of the source L1 and L2 as a reference. In the voltage wave of the source during the half cycle marked L1, the terminal L1 is positive and during the half cycle marked L2 the terminal L2 is positive.

The lead trail module LT, the delayed firing module DF and the heat control module HC, are arranged in any well known manner to supply, respectively, a series of signals shown by the curves 2N1, 2N3 and 1N9. One manner in which these signals are supplied is explained in the Meyer et al. application supra. The lead trail module LT provides the input terminal 2N1 of the NOR N1 with a signal which is normally "1" and which changes to an "0" during the short time interval during each of the L1 half cycles between 355° and 360° of the voltage wave of the source. The delayed firing module DF supplies an input signal to the terminal 2N3 of the NOR N3 which switches from "0" to "1" at 85° in each of the L2 half cycles and from "1" to "0" at approximately 270° in each of the succeeding L1 half cycles. The heat control module HC as disclosed in the Meyer et al. application supra, supplies a signal to input terminal 1N9 of the NOR N9 which alternates between "1" and "0" each 180° of the source voltage wave. The instant of change of the signal at the terminal 1N9 is adjustable and the sequence of change is arranged so the signal changes from "0" to "1" during an L1 half cycle and from "1" to "0" during the succeeding L2 half cycle.

During standby conditions, the signal from the delayed firing module DF, as shown by curve 2N3, is supplied to the NOR memory including the NORS N2 and N3 causing the output signal of the NOR N3 to be "0" and the output signal of the NOR N2 to be "1." The "1" output signal of the NOR N2 is changed to a "0" signal by the NOR N18 and is supplied as a "0" input signal to the terminal 1T2 of the timer "T." The "0" input signal at the terminal 1T2 causes the NOR N14 to switch to its nonconductive state so the capacitor 44 is in a condition to accept a charge in a manner which will be hereinafter described. The NOR memory including the NORS N15 and N16, which has been previously switched by a reset signal provided when the control is either initially energized or as a result of a reset signal from a previous sequence, causes the NOR N15 to provide an output signal of "1" which is transmitted through the output terminal 0T1 to one of the input terminals of the NOR N1 causing the NOR N1 to have a continuous "0" output signal during standby conditions.

When the initiating switch 12 is closed, and as will be later explained, the capacitor 44 begins to charge during the squeeze period and when charged causes the NOR memory consisting of the NORS N15 and N16 to switch, in a manner which will be later described, changing the output signal at the terminal 0T1 of the timer "T" from "1" to "0," as shown on curve 0T1. The instant of closure of the initiating switch 12 and the consequent switching of the NOR memory consisting of the NORS N15 and N16 may occur at random during either the L1 or L2 half cycles. The "0" signal at the terminal 0T1 is impressed as an input to one of the terminals of the NOR N1 which also has an input signal at the terminal 2N1 as shown by the curve 2N1. It will be seen that the only time the signals at both of the input terminals of the NOR N1 are "0" occurs between 355° and 360° and this causes the output signal of the NOR N1 at the terminal 3N1 to change momentarily from a "0" to a "1" as is shown by the curve 3N1. The momentary output "1" signal from the NOR N1 is transmitted to the NOR N2 as an input. As shown on curve 2N3 during the interval between 270° on the L1 half cycle and 85° of the subsequent L2 half cycle, the terminal 2N3 receives a "0" signal from the delayed firing module DF. Thus normally the NOR memory consisting of NORS N2 and N3 is switched so terminal 3N2 has a "1" output signal. Normally the only instance that the NORS N2 and N3 can switch is at 355° when the NOR memory consisting of NORS N2 and N3 is switched in response to the momentary "1" signal from the NOR N1. At this instant the NOR N2 switches to provide a "0" output signal as shown by the curve 3N2 and the NOR N3 switches to provide a "1" signal as shown on the curve 3N3. At 85° the signal from the delayed firing module DF changes from "0" to "1," which causes the NOR memory consisting of the NORS N2 and N3 to again switch whereby the NOR N2 provides a "1" output signal and the NOR N3 provides a "0" output signal, as shown by the curves 3N2 and 3N3.

The signal as shown by the curve 3N2 may be considered as a counting pulse when inverted by the NOR N6 and transmitted as an input to the terminal 1C1 of the counter "C" and to cause switching of the counter at 85° at the end of the squeeze period. The signal as shown by the curve 3N2 may also be considered as a timer reset pulse which is inverted by the NOR N18 and supplied as an input to the terminal 1T2 of the timer "T" as shown by the curve 1T2. The change at 355° from "0" to "1" to the input terminal 1T2 of the counter "C" causes the transistor within the NOR N14 to switch to a conductive state and provides a rapid discharge path for capacitor 44 through a circuit which includes the common lead in which the junction 46 is connected, the NOR N14, the diode D1, the resistor R1 and the junction 43. Also the "1" signal at the terminal 1T2 at 355° causes the NOR memory consisting of the NORS N15 and N16 to switch so the terminal 0T1 provides a "1" signal.

Thus, at the end of each timing interval, the timer "T" is reset at 355°–360° of the L1 half cycle which occurs prior to the 85° of the subsequent L2 half cycle at which the counter "C" is stepped one count.

During the weld interval, the capacitor 44 is charged and when the charge on the capacitor 44 is sufficient to overcome the breakdown voltage of the zener diode ZD, the NOR memory consisting of the NORS N15 and N16 is switched at a random instant to cause a "1" to "0" signal change at the terminal 0T1 as shown by the curve 0T1. The switching of the NOR memory consisting of the NORS N2 and N3 is synchronized by the NOR N1 to occur at 355° as previously described. During the interval between 355° and 85° the output signal of the NOR N2 is "0" which is inverted by the NOR N6 to cause the counter "C" to be stepped at 85° to end the weld period. At 355° the signal change to "1" as shown by the curve 1T2 causes the timer "T" to again be reset to initiate timing of the hold period. The sequence which causes the change in signals occurring at the end of the hold period and at the end of off periods are identical to those described in connection with the squeeze and weld periods and further explanation thereof is not necessary.

From the preceding description, it is clear that during steady conditions, the "0" signal at the terminal 16 causes the NOR N17 to provide a "1" input signal to the reset terminal of the counter "C" preventing the NOR memories within the counter from switching and also the "0" signal is transmitted as an input to the terminal 10R1 of the module "OR." The counter "C" will supply signals as shown in FIG. 5 to the terminals 0C1–4 which are connected to the input terminals 10R2–10R5 of the module "OR." As previously explained, the counter "C" after the initiating switch 12 is closed will cause the signals at the terminals 0C1–4 to change as shown in FIG. 5 during the standby, squeeze, weld, hold and off periods of the welding sequence. The signals shown in FIG. 5 are illustrated in FIG. 4 in a different form to facilitate understanding of the operation of the module "OR," in FIG. 2.

An understanding of the charging and discharge circuit for the capacitor 44 in the timing module "T" in FIG. 2 also is important to the understanding of the operation of the circuit shown in FIG. 2. As is clearly shown in the Meyer et al. application supra, a PNP type transistor within each of the NOR units has its emitter connected to a common bus and its collector connected through a junction and a resistor to a negative supply. The output terminal of each NOR unit is connected to the collector of the transistor within the NOR unit so that, when the transistor is conducting to provide a "0" output signal, the output terminal and common bus are at substantially the same potential and, when the transistor within the NOR unit is nonconductive to provide a "1" output signal, the output terminal of the NOR unit and the negative supply are at the same potential. Thus it will be seen that when the NOR N14 provides a "0" output signal, as when the transistor within the NOR N14 unit is conducting, a low resistance discharge path is provided for the capacitor 44. Likewise, when the output signal of the NOR N14 is "1," as when the transistor with the NOR N14 is non conducting, the discharge circuit is virtually open circuited and because of the blocking action of diode D1 the capacitor 44 will be in condition to charge through a circuit which includes; the junction 46, the capacitor 44, the junction 43, the terminal 1T1, the terminal 00R1 and through any one of four parallel circuits to the negative supply. The first parallel circuit includes the diode D2, the junction 48, the terminal 00R2 and the resistor R2. The second parallel circuit includes the diode D3, the junction 50, the terminal 00R3 and the resistor R3. The third parallel circuit includes the diode D4, the junction 52, the terminal 00R4 and the resistor R4. The fourth parallel circuit includes the diode D5, the junction 54, the terminal 00R5 and the resistor R5. The resistors R2–R5 are each adjustable so as to vary the rate of charge of the capacitor 44.

It will be observed that the junctions 48, 50, 52 and 54 are connected through the diodes D6–D14 to the input terminals 10R1–10R5 in a manner previously described. The input terminals 10R2–10R5 are connected to the output terminals 0C1–0C4 of the counter "C" which have signals impressed thereon as shown in FIGS. 4 and 5. From the foregoing explanation it is apparent that whenever the terminals 10R1–10R5 have a "0" signal impressed thereon by either the module 10 or the counter "C," then the respective junctions 48, 50, 52 or 54 which are connected through the diodes D6–D14 to the terminals 10R1–10R5 will have a "0" signal impressed thereon because the diodes D6–D14 are connected to conduct current from the terminals 10R1–10R5 to the junctions 48, 50, 52 and 54. Thus when the junctions 48, 50, 52 and 54 have a "0" signal impressed thereon from any source, the junctions having the "0" signal will be at the same potential as the terminal 46 and the capacitor 44 will not charge through the particular junction having the "0" signal. However, when all of the sources through the diodes D6–D14 provide a "1" signal to any one of the junctions 48, 50, 52 or 54, then the capacitor 44 will charge through the circuit which includes the particular junction.

In view of the foregoing, it will be seen with reference to FIG. 4 that during standby periods, the input terminals 10R1, 10R3 and 10R5 have a "0" signal impressed thereon. The terminal 10R1 is connected to the junction 48 through the diode D6. The terminal 10R3 is connected to the junction 50 through the diode D9. The terminal 10R5 is connected to the junctions 52 and 54 through the diodes D12 and D14. Thus during standby conditions, all of the junctions 48, 50, 52 and 54 have a "0" signal impressed thereon and the capacitor 44 will not charge. Further understanding of the invention will be had from a consideration of its operation through a complete welding sequence.

When the initiating switch 12 is closed, the squeeze period begins. The module 10 provides a continuous "1" signal to the terminals 14 and 16. The "1" signal at the terminal 14 causes the amplifier 18 and the relay 20 to cause the motor 21 to move the welder electrodes 22 into physical engagement with the parts to be welded. The "1" signal at the terminal 16 is inverted to an "0" signal by the NOR N17 and thus removes the reset signal to the counter "C." The "1" signal at the terminal 16 is also inverted by the NOR N4 to a "0" signal so the input terminal 1T2 of the timer "T" is controlled by the output signal from the NOR N18 which at this time supplies a "0" output signal because of the "1" input signal it receives from the terminal 3N2. The "1" output signal at terminal 16 is also transmitted to the junction 48 through the diode D6 during the sequence which includes the squeeze, weld, hold and off periods which occurs when the initiating switch 12 is closed. As shown in FIG. 4, during the squeeze period, the terminals 10R3 and 10R5 have a "0" signal. The terminal 10R3 is connected to the junctions 50 and 54 through the diodes D9 and D13. The terminal 10R5 is connected to the junctions 52 and 54 through the diodes D12 and D14. Therefore during the squeeze period, the capacitor 44 will not charge through the circuits associated with junctions 50, 52 or 54. However, during the squeeze period the terminals 10R2 and 10R4 each have a "1" signal and are respectively connected to the junction 48 through the diodes D7 and D8. Thus junction 48 has a "1" signal impressed thereon through each of the signal sources connected through the diodes D6–D8 and the capacitor 44 charges through a circuit which includes the terminal 00R1, the diode D2, the junction 48, the terminal 00R2, the resistor R2 to the negative side of the source.

As heretofore explained, when the charge on the capacitor 44 exceeds the breakdown voltage of the zener diode ZD, the transistor within NOR N15 conducts and the output signal at the terminal 0T1 changes from a "1" to "0" as shown on the curve 0T1 in FIG. 3. The effect of this change is controlled by the lead trail module LT, delay firing module DF, the NORS N1, N2, N3 and N18 so a signal change as shown by the curves 1T2 and 1C1 in FIG. 3 appears at the terminals 1T2 and 1C1. The "1" pulse to the terminal 1T2 causes the discharge of capacitor 44 and the resetting of the NOR memory consisting of the NORS N15 and N16 shortly after 355°. The "1" signal phase at the terminal 1C1 causes the counter "C" to switch at 85° so the signals appear as shown under weld in FIG. 4 to end the squeeze period and begin the weld period. From FIG. 5 it is apparent that only during the weld period to the terminals 0C1 and 0C4 of the counter "C" simultaneously have a "1" signal. These signals are both impressed on the input terminals 1N5 and 2N5 of the NOR N5 after the counter "C" is switched at 85° of the first half cycle of L2 polarity during which weld current is to flow. Also at this time, as shown by the curve 3N2 at 85°, the signal at the terminal 3N2 switches to a "1." This "1" signal is inverted to a "0" signal by the NOR N6 and supplied as an input to the remaining input terminal 4N5 of the NOR N5. The three "0" input signals to the NOR N5 causes the output signal of the NOR N5 to switch to a "1" which causes the NOR memory consisting of the NORS N7 and N8 to switch causing the signal at the junction 36 to become "0" throughout the weld interval. The NOR N9 thus receives a "0" signal input from the junction 36 so its switching is exclusively controlled by the heat control module HC which supplies signals as shown on the curve 1N9 in FIG. 3.

Throughout the weld interval, the heat control panel HC causes the NOR N9 to switch in accordance with the signals shown by the curve 1N9 in FIG. 3, and cause the firing panel FP to control the flow of welding current through the transformer 38. It will be observed that because of the switching of the counter "C" at 85° during the L2 half cycle of the alternating current supply, welding current flow begins during the L2 half cycle. At the end of the weld interval, the charge on the capacitor 44 causes switching of the NOR memory consisting of the NORS N15 and N16 in the timer "T" so that the signal at the output terminal 0T1 becomes "0." This "0" signal is transmitted as an input signal to the NOR N1 which also receives an input signal at terminal 2N1 from the lead trail module LT as shown on the curve 2N1 in FIG. 3.

The signal at terminal 2N1 permits the NOR N1 to switch momentarily between 355°–360° and provide a momentary output signal of "1." During the interval between 355° of the L1 half cycle and 85° of the subsequent L2 half cycle the delayed firing module DF supplies a "0" at terminal 2N3 as shown on the curve 2N3. Thus at 355° the "1" signal at the terminal 2N1 causes the NORS N2 and N3 of the NOR memory to switch so the signals at terminals 3N2 and 3N3 become "0" and "1" respectively.

The "0" signal at terminal 3N2 is inverted by the NOR N6 and supplied as an input to the NOR N5 which causes the NOR N5 to switch and provide a "0" input to the NOR N7 which is connected with the NOR N8 as a NOR memory. Simultaneously, at 355° the lead trail module LT through the junction 40 supplies a "0" signal which is inverted to a "1" signal by the NOR N19 and supplied as an input to the NOR N8. The input signal from NOR N19 to NOR N8 causes the NORS N7 and N8 to switch at 355° and provide a "1" signal input to the NOR N9 to end the flow of welding current. Thus as the flow of welding current was initiated at 85° of an L2 cycle and terminated at 355° of an L1 half cycle, full cycle welding current flow is assured to prevent saturation of the welding transformer 38.

At 85° during the L2 half cycle after the welding current flow ceases, the signal from the delayed firing module DF at terminal 2N3 causes the NOR memory consisting of the NORS N2 and N3 to switch so the signal at the terminal 3N2 becomes "1" as shown on curve 3N2. The "0" to "1" change in the signal at terminal 3N2 is inverted by the NOR N6 and causes the counter "C" to step and cause the signals at the output terminals of the counter to appear as shown in the H column in FIG. 5 and thus begin the hold period. It is to be noted that the "1" signals at the terminals 0C1 and 0C4 prevent further flow of welding current in the welding electrodes by causing the NOR N5 to have a constant output signal of "0" even though the signal from the NOR N6 becomes "0" due to the change in the signal at terminal 3N2.

During the hold cycle, as shown in FIG. 4, the input terminals 10R2 and 10R5 have a "1" signal and the terminals 10R3 and 10R4 have a "0" signal. The terminal 10R3 is connected through the diode D9 to the junction 50 and through the diode D13 to the junction 54. The terminal 10R4 is connected through the diode D8 to the junction 48 and through the diode D10 to the junction 50. Thus the junctions 48, 50 and 54 each have a "0" signal impressed thereon preventing the capacitor 44 from charging through either of these junctions. The junction 52 is connected through the diode D11 to the terminal 10R2 and through the diode D12 to the terminal 10R5. Because both of the terminals 10R2 and 10R5 have a "1" signal impressed thereon during the hold period, the capacitor 44 charges through a path which includes the diode D4, the junction 52, the terminal 00R4 and the resistor R4.

When the charge on the capacitor 44 is sufficient to exceed the breakdown voltage of the zener diode ZD, the NOR memory consisting of the NORS N15 and N16 is switched to cause a "0" signal at the terminal 0T1 of the timer "T." This signal causes the NOR N1 and the NOR memory consisting of the NORS N2 and N3 to switch at the instants determined by the lead trail module LT and the delay firing module DF so the signals as shown on the curves 1C1 and 1T2 are impressed on the input terminal 1C1 of the counter "C" and the terminal 1T2 of the timer "T." The input signal to the terminal 1T2 causes the capacitor 44 to discharge and the NOR memory consisting of the NORS N15 and N16 to be reset at 355°–360°. The input signal to the terminal 1C1 causes the counter "C" to switch at 85° and thereby end the hold period and begin the off period and cause output signals, as shown in the 0 column of FIG. 4 wherein the terminals 0C2 and 0C4 have a "1" signal and the terminals 0C1 and 0C3 have a "0" signal.

As shown in FIG. 4, during the off period the signals at the terminals 10R2 and 10R4 are both "0." These "0"

signals are also impressed through the junctions 30 and 32 on the input terminals 24 and 26 of the module 10. The module 10 in response to the "0" input signals at the terminals 24 and 26 provides a "0" signal at the terminal 14 to cause the relay 20 to be de-energized and thus cause the welding electrodes 22 to move out of engagement with the work piece. In the event the initiating switch 12 is open at the end of the off period, the module 10 will also cause the signal at the terminal 16 to change from "1" and provide a "0" signal to the terminal 10R1 to cause the control system to return to standby conditions after the change at the terminals 1C1 and 1T2 causes the counter "C" and the timer "T" to switch at the end of the off period as will now be set forth.

During the off period, the terminals 10R2 and 10R4 each have an "0" signal. The junction 48 is connected through the diode D7 to the terminal 10R2. The junction 50 is connected through the diode D10 to the terminal 10R4. The junction 52 is connected through the diode D11 to the terminal 10R2. Thus each of the junctions 48, 50 and 52 have an "0" signal impressed thereon and the capacitor 44 will not charge through either of these junctions. The junction 54 is connected through the diode D14 to the terminal 10R5 and through the diode D13 to the terminal 10R3. As each of these terminals have a "1" signal output, the junction 54 has a "1" signal and the capacitor 44 charges through a circuit which includes the diode D5, the junction 54, the terminal 00R5 and the resistor R5.

When the charge on the capacitor 44 is sufficient to exceed the breakdown voltage of the zener diode ZD, the NOR memory, consisting of the NORS N15 and N16, switches to cause an "0" signal at the terminal 0T1 of the timer "T." This "0" signal causes the NOR N1 and the NOR memory consisting of the NORS N2 and N3 to switch at the instants determined by the lead trail module LT and the delayed firing module DF resulting in the signals as shown by the curves 1C1 and 1T2 being impressed on the input terminal 1C1 of the counter "C" and the terminal 1T2 of the timer "T." The input signal to terminal 1T2 causes the capacitor 44 to discharge and the NOR memory consisting of the NORS N15 and N16 to be reset at 355°–360°. The input signal to the terminal 1C1 causes the counter "C" to switch at 85° and thereby end the "off" period and provide output signals as shown in the S column in FIG. 4 to begin a squeeze period of another weld sequence which includes a weld period, a hold period, and an off period as described for the preceding weld sequence.

If desired, the control shown in FIG. 1 may be provided with an arrangement whereby the hold period may be eliminated and the control will sequence directly from the weld period to the off period. This arrangement is frequently desirable to decrease the time interval of the welding sequence so that a series of welds may be made with greater rapidity.

As shown in FIG. 1, a zero hold module ZH, which is shown in detail in FIG. 6, has an input terminal connected to junction 31 and an output terminal OZH connected through a switch 55 to an additional input of the NOR N2. During the normal sequence when a hold period is desired in the weld sequence, the switch 55 is open. However, if it is desired to have the static welder control operate without a hold period, switch 55 is closed to eliminate the hold period in a manner which will be hereinafter explained.

As shown in FIG. 6, a transistor TR has an emitter TR*e*, a collector TR*c* and a base TR*b*. The emitter TR*e* is connected to a common or neutral terminal. The collector is connected through a junction 56 and a resistor R6 to the negative —20 volt D.C. supply. The common terminal and negative supply also supply the remaining static components of the system. The junction 56 is directly connected to the output terminal OZH. The base TR*b* is connected through a junction 58 and a resistor R7 to the negative supply. The junction 58 is connected through a diode D15 to a junction 60. The junction 60 is connected through a resistor R8 to the common terminal and through a capacitor 62 to the input terminal 31.

The input terminal 31 receives a signal as shown in curve 10R4 in FIG. 4. It will be observed in FIG. 4 that at 85° the counter C causes the input signal at junction 31 to switch from "1" to "0." Thus during the squeeze, standby and weld periods the junction 31 has a negative 20 volt potential impressed thereon and the capacitor 62 charges through a circuit which includes the common terminal, the resistor R8, the junction 60, the capacitor 62 and the junction 31. The direction of the charging current flow from the common terminal to the junction 31 causes the junction 60 side of capacitor 62 to have a positive polarity impressed thereon. It will be also observed that the base TR*b* of the transistor TR is tied through a resistor R7 to the negative supply. This arrangement causes the transistor TR to be biased to full conduction. When transistor TR conducts the junction 56, the output terminal OZH and the common terminal are substantially at the same potential and the output terminal OZH therefore provides an "0" signal. This "0" signal, which is transmitted through the closed switch 55 as an input to NOR N2, is ineffective to cause switching of the NOR N2.

As previously explained, at the end of the weld period at 85° the signal at the input terminal 1C1 of the counter C causes the counter "C" to switch so that the signal at the output terminal 0C3 of the counter "C" switches from "1" to "0." This signal change causes the junction 31 and the common terminal to be at the same potential. This change in potential at junction 31 causes the positive charge on the capacitor 62 to be transmitted through the diode D15 directly as a short positive voltage spike to the base TR*b* of transistor TR to momentarily render the transistor TR nonconducting and cause the transistor TR to provide a momentary negative voltage pulse at the output terminal OZH. This negative voltage pulse, which exists for approximately 100–200 microseconds, is transmitted as an input "1" signal to the NOR N2. It will be observed from curve 2N3 that at the instant when the NOR N2 receives a momentary "1" signal from the zero hold module ZH the late firing module DF also supplies the NOR 3N with a "1" signal. Thus NORS N2 and N3 both receive a "1" input signal at the same momentary instant causing their output signals to be "0." The momentary "0" signal at the output terminal 3N2 of the NOR N2 is inverted by the NOR N6 and supplied to the input terminal 1C1 of the counter which causes the counter "C" to again switch so as to provide signals at the output terminals 0C1–0C4 as indicated during the off period as shown in FIG. 5. Thus it is apparent the signal at 85° which caused the counter "C" to switch from weld to hold also causes the zero hold module ZH to supply a momentary signal which causes the counter "C" to switch from hold to off, so the counter is effectively switched from the weld period through the hold period to the off period in a single half cycle to eliminate the hold period.

There has thus been described a control system which uses static components to control the sequence and duration of a plurality of operations such as used in a resistance welder apparatus. The control system uses a single counter and a single timer and a plurality of resistors which are inter-connected with each other in a manner so that a timing capacitor within the timer may charge through any one of the resistors in a sequence determined by the counter and wherein the switching of the timer and counter is arranged so the timer is reset before the counter. The control system also combines the signals from a lead trail and a delayed firing module to provide full cycle welding current flow with minimum transient current flow.

While certain preferred embodiments of the invention have been specifically disclosed, it is understood that the invention is not limited thereto, as many variations will be readily apparent to those skilled in the art and the invention is to be given its broadest possible interpretation within the following claims.

What is claimed is:

1. An electric control system for sequencing and controlling the duration of a plurality of operations, comprising; a counter including a plurality of NOR units connected to supply different combinations of output signals to output terminals of the counter which are equal in number to the operations to be sequenced, a plurality of adjustable resistors equal in number to the number of operations to be sequenced, a single timer including a NOR memory and a capacitor arranged to switch the NOR memory when a charge on the capacitor exceeds a predetermined value, and a plurality of diodes connected in separate circuits between the capacitor and the resistors and between the resistors and the output terminals of the counter and arranged to permit the capacitor to charge through only one of said resistors during any one interval determined by the timer and through any of said resistors in a sequence determined by the combination of signals at the output terminals of the counter.

2. An electric control system for sequencing and controlling the duration of a plurality of operations, comprising; a counter having an input terminal and a plurality of NOR units connected to be responsive to a signal at the input terminal and arranged to supply different combinations of signals to a plurality of output terminals which are equal in number to the number of operations to be sequenced, a plurality of adjustable resistors equal in number to the number of operations to be sequenced, a single timer having a NOR memory connected to provide an output signal to an output terminal and a capacitor arranged to switch the NOR memory whenever a charge on the capacitor exceeds a predetermined value, a circuit connecting the output terminal of the timer to the input terminal of the counter for switching the NOR units of the counter and thereby changing the combination of signals at the output terminals of the counter, and a plurality of diodes connected as OR logic elements in separate circuits between the resistors and the timer and between the resistors and the output terminals of the counter, said diodes being arranged to permit the capacitor to charge through only one of said resistors during any one time interval determined by the timer and through any of said resistors in a sequence determined by the combination of signals of the counter.

3. An electric control system for sequencing and controlling the duration of a plurality of operations, comprising; a timer including a NOR memory and a timing capacitor arranged to supply a switching signal to the NOR memory whenever the charge on the capacitor exceeds a predetermined value, a plurality of separate resistors equal in number to the number of operations to be sequenced, a counter having a plurality of NOR units connected to output terminals equal in number to the number of operations to be sequenced and arranged to supply different combinations of signals to the output terminals equal in number to the number of operations to be sequenced, and an OR circuit module having a common lead connecting the capacitor through a plurality of parallel circuits each of which includes a diode, a junction and one of said resistors and circuit means including a plurality of circuits each including a diode connecting the junctions of said parallel circuits to the output terminals of the counter, said circuits being arranged to permit the capacitor to charge through any selected one of said resistors in response to the combination of signals from said counter.

4. An electric control system for sequencing and controlling the duration of the operations of a resistance welder the combination comprising; a timer including a NOR memory and a timing capacitor arranged for switching the NOR memory and supplying an output signal whenever the charge on the capacitor exceeds a predetermined value and including an input means for discharging the capacitor and resetting the NOR memory in response to an input signal, a counter having a plurality of NOR units connected to a plurality of output terminals equal to the number of operations to be sequenced by the welder control and arranged to be switched and supply different combinations of output signals to the output terminals equal in number to the number of said operations to be sequenced in response to a signal change at an input signal of the counter, means including a NOR and a NOR memory having output terminals connected to the input means of the timer and the input terminal of the counter for supplying signals for resetting the timer and switching the NORS of the counter, a plurality of adjustable resistors equal in number to the number of operations to be sequenced, and an "OR" circuit module having a common lead connecting the capacitor to a plurality of parallel circuits each of which includes a diode, a junction and one of the resistors and circuit means each including a diode, one of the junctions in the parallel circuits and one of the output terminals of the counter, said circuit means and parallel circuits being arranged so the capacitor is charged through only one of said parallel circuits during an interval determined by the timer and through any of said parallel circuits in a sequence determined by the output signals from the counter.

5. In a resistance welder control, the combination comprising: a single timer having a timing capacitor arranged to switch a NOR memory and provide an output signal whenever the charge on the capacitor exceeds a predetermined value and reset means arranged to discharge the capacitor and reset the NOR memory in response to a reset signal, a plurality of adjustable resistors equal in number to the periods of operation to be sequentially timed by the resistance welder control, a counter arranged in response to an input signal to provide different combinations of output signals which combinations are equal in number to the number of said resistors, an OR circuit means connecting the timer, resistors and counter in circuit with each other and arranged so the capacitor is charged through any of said resistors in a sequence determined by the counter and through only one of said resistors during a period determined by the timer.

6. The combination as recited in claim 5 wherein said means supplies the timer with a reset signal which resets the timer at the end of one half cycle of the alternating voltage wave of the source and the counter with an input signal which switches the counter at a predetermined instant during the succeeding half cycle of the alternating voltage wave of the source.

7. The combination as recited in claim 6 wherein the counter supplies a signal to a weld firing means to initiate welding current flow.

8. In a resistance welder control, the combination comprising; a single timer including a NOR memory and a timing capacitor arranged for supplying a switching signal to the memory whenever a charge on the capacitor exceeds a predetermined value and including means for discharging the capacitor and resetting the memory in response to a reset signal, said timer also having an output terminal in circuit with the NOR memory and a terminal in circuit with the capacitor, a first NOR having an input connected to the output terminal of the timer, a lead trail module having an output connected to a second input of said first NOR, said lead trail module being arranged to supply a signal change for switching said first NOR at the end of each half cycle of one polarity of an alternating voltage supply, a second and a third NOR connected as a NOR memory with the second of said NORS having an input connected to an output of the first NOR and the third of NORS having an input terminal and an output terminal, a delayed firing module having an output connected to the input of the third NOR and arranged for supplying a predetermined instant during each half cycle of an alternating voltage source which is opposite in polarity of the half cycle during which the lead trail module supplies a signal change, a plurality of adjustable resistors equal in number to the periods of operation to be sequentially timed by the resistance welder control, a counter having an input terminal connected to the output terminal of the third NOR and having a plurality of NOR units arranged to be switched in response to changes in the output signal of the third NOR by the delayed timing module to provide different combinations of output signals at output terminals of the counter which combinations are equal in number to the number of resistors and change at the instant of switching of said third NOR, an "OR" circuit means connecting the timer, the resistors and counter in circuit with each other and arranged so the capacitor is charged through the resistors in a sequence determined by the combination of signals of the counter and through only one of said resistors during an interval determined by the timer, circuit means responsive to the change in output signal from said second NOR by the lead trail module for supplying the timer with a signal for resetting the NOR memory and discharging the capacitor within the timer at the instant of occurrence of the output signal change of the second NOR by the lead trail module whereby the timer is reset during the half cycle preceding the switching of the counter, and a weld firing means having inputs connected to the output signals of the counter, the lead trail module and the second NOR for controlling the flow of welding current through a welding transformer in response to signals to its inputs.

9. The combination as recited in claim 5 wherein an input logic circuit means provides a change in an output signal in response to a closure of an initiating switch which change in output signal is transmitted to the reset means of the timer, a reset terminal of the counter, and an input terminal of the OR circuit means.

10. The combination as recited in claim 9 wherein the counter supplies input signals to the input logic circuit means for preventing a change in the output signal of the input logic circuit means during the periods of operation which are sequentially timed by the resistance welder control.

11. In a static resistance welder control the combination comprising; a plurality of resistors equal in number to the number of operations to be sequenced by the control, a single timer having a timing capacitor, a counter arranged to provide a plurality of different combinations of output signals equal in number to the number of resistors, and circuit means interconnecting the resistors, capacitor and counter, said circuit means being arranged so the capacitor is charged through any one of said resistors during an interval determined by the timer in a sequence determined by the output signals from the counter.

12. The combination as recited in claim 11 wherein means are provided for resetting the timer prior to the resetting of the counter.

13. The combination as recited in claim 11 wherein means are provided for resetting the timer at the end of one half cycle of an alternating voltage wave and resetting the counter at a predetermined point on the next succeeding half cycle of the alternating voltage wave.

14. The combination as recited in claim 11 wherein means are provided for resetting the timer at 355° to 360° at the end of one half cycle of an alternating voltage wave and for resetting the counter at 85° of the next succeeding half cycle of the alternating voltage wave.

15. The combination as recited in claim 11 wherein the counter supplies a signal to means for controlling current flow through a resistance welding transformer during only one of the operations and the timer supplies a signal to said means for causing current flow through said transformer.

16. In a resistance welder control, the combination comprising; a counter arranged to switch in response to an input signal and sequentially supply a plurality of different combinations of output signals, means responsive to the output signals from the counter for supplying the counter with an input signal after a predetermined time interval, and a means responsive to one of the combinations of output signals for supplying the counter with an input signal immediately after the first mentioned means has supplied the counter with the input signal which caused the counter to switch and provide said one combination signal.

17. In a resistance welder control, the combination comprising; a plurality of resistors equal in number to the number of operations to be sequenced by the control, a counter arranged to be switched in response to an input signal and supply a plurality of different combinations of output signals equal in number to the number of resistors, a timer having a timing capacitor and means arranged to supply an input signal for switching the counter whenever a charge on the capacitor exceeds a predetermined value, circuit means interconnecting the resistors, capacitor and counter, said circuit means being arranged so the capacitor is charged through any one of said resistors in a sequence determined by the output signals from the counter and means responsive to one of said plurality of different combinations of output signals from the counter for supplying a switching input signal to the counter independently of the timer.

18. In a static resistance welder control arranged to sequence and control the duration of a squeeze period, a weld period, a hold period, and an off period of a weld sequence, the combination comprising; a counter arranged to be switched in response to an input signal and sequentially supply a different combination of output signals for each of the periods, means responsive to the combination of output signals of the counter for supplying a switching input signal to the counter, an adjustable time interval after a change in the combination of output signals from the counter, and means responsive to one combination of output signal for supplying a switching input signal to the counter immediately after the counter switches to provide said one combination of output signals.

References Cited by the Examiner

UNITED STATES PATENTS

| | | | |
|---|---|---|---|
| 2,813,199 | 11/1957 | Sciaky et al. | 328—75 |
| 3,205,378 | 9/1965 | Kline | 219—108 X |

OTHER REFERENCES

Darlin: "Transistor NOR Elements Program Welder," Control Engineering, vol. 7, February 1960, pp. 111 and 113.

JOHN F. COUCH, *Primary Examiner.*

ORIS L. RADER, *Examiner.*

W. M. SHOOP, *Assistant Examiner.*